W. F. GOODWIN.
Harvester.

No. 111,633. Patented Feb. 7, 1871.

Witnesses.

Wm. F. Goodwin
by his Attorney
A. M. Smith

UNITED STATES PATENT OFFICE.

WILLIAM F. GOODWIN, OF METUCHEN, NEW JERSEY.

IMPROVEMENT IN HARVESTERS.

Specification forming part of Letters Patent No. 111,633, dated February 7, 1871.

*To all whom it may concern:*

Be it known that I, WILLIAM F. GOODWIN, of Metuchen, county of Middlesex, State of New Jersey, have invented certain new and useful Improvements in Harvesters, of which the following is a full, clear, and exact description, reference being had to the accompanying drawing, making a part of this specification, in which—

Figure 1:
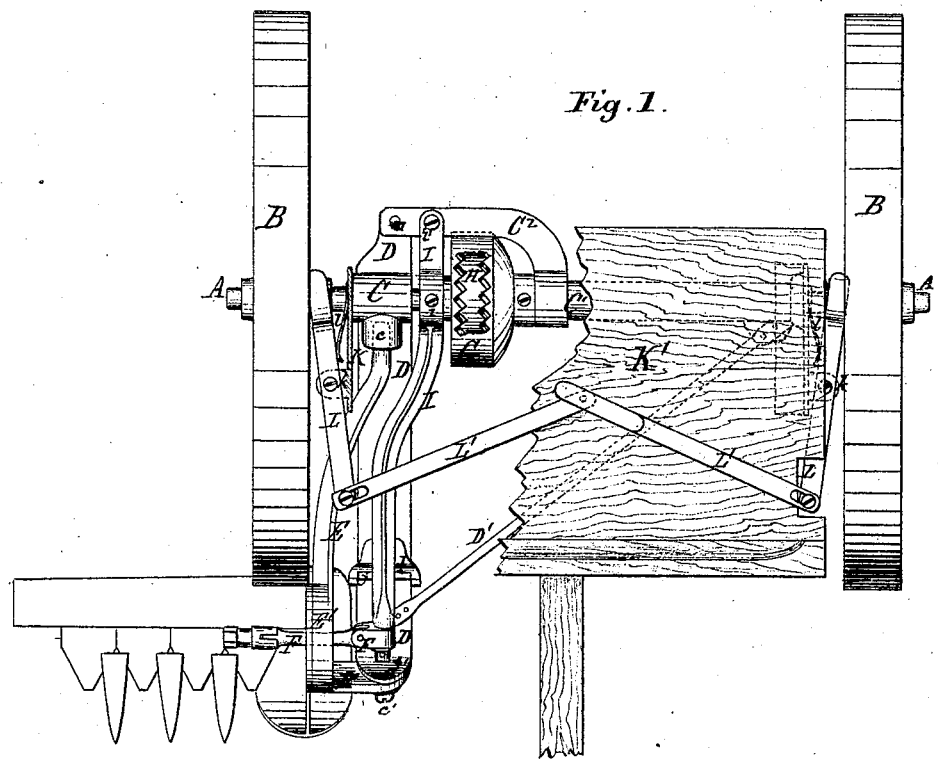
Figure 3:
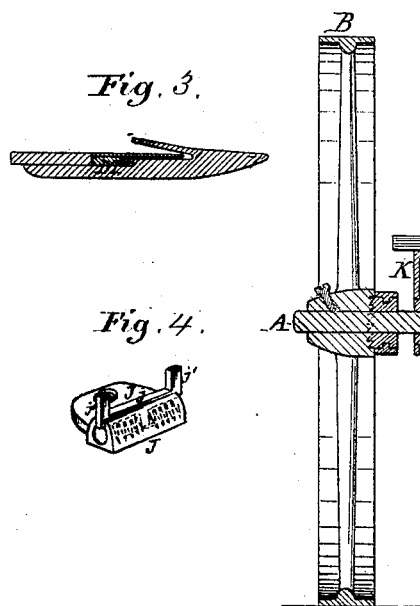
Figure 4:
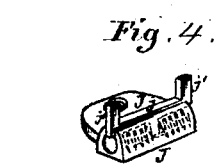
Figure 2:
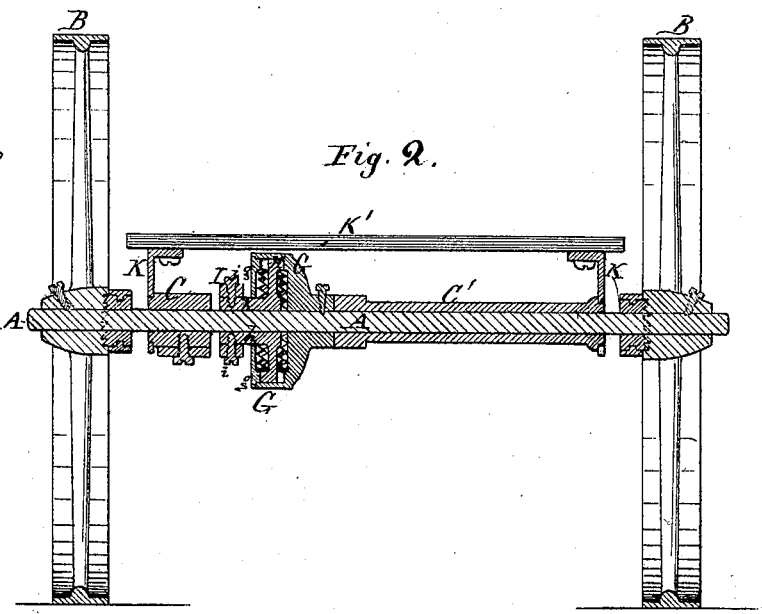

Figure 1 is a plan view of a machine embracing my improvements. Fig. 2 is a transverse vertical section taken through the main drive-wheels and axle. Fig. 3 is a longitudinal section through one of the guard fingers, and Fig. 4 is a perspective view of the spring-buffer.

Similar letters of reference denote corresponding parts wherever used.

My invention relates to a novel construction and arrangement of the driving mechanism of the vibrating cutter-frame and pivotal connection of the cutting apparatus therewith, and of the spring-buffers for relieving the machine from the heavy jar and strain consequent upon the rapid reciprocation of the cutters, and will be best understood from the following description with reference to the drawing, in which—

A represents the main drive-wheel axle; B B, the driving-wheels, mounted on the axle and represented as keyed to and turning therewith, but which, in practice, it is proposed shall be mounted loosely upon the axle and connected therewith in the forward movement of the machine by sliding clutches feathered to said axle.

C C¹ are two sleeves mounted loosely on the axle A, one of which, C, is attached to or cast with the frame-bar D, and the other one of which, C¹, is connected with the frame-bar D by means of an oblique brace-rod, D′, and a plate, C², formed upon or attached to sleeve C¹, and fastened to bar D at d, the sleeves C C¹, bar D, and ties or braces C² and D′ constituting the vibrating cutter-frame.

The sleeve C is provided with a longitudinal socket or sleeve, c, which affords a pivotal bearing for the inner or heel end of the drag or brace bar E, and the outer or vibrating ends of frame-bar D and brace-bar E are bent at right angles or provided with flanges d′ e′, to afford a pivotal bearing, c′, to the outr ore vibrating end of brace-bar E, about in the same longitudinal plane with the rear pivotal support at c, as shown in Fig. 1.

The brace-bar E is expanded and perforated at E′, to permit the pitman F to pass through it, the perforation being of sufficient diameter to allow the required vibration of the pitman.

G is a driving-wheel, keyed to and turning with the axle between the sleeves C C¹. Said wheel is composed of two vertical wave or zigzag wheels or disks, connected by a rim or ring in such manner as to leave a space between the adjacent zigzag faces for the interposition of a sliding zigzag or wave disk, H.

The rim which connects the two parts of the wheel G may be formed upon one of said parts and fastened to the other by bolts or screws, or it may be made separate and secured to said parts to cause their rotation together in any suitable manner, and constitutes an inclosing-case for protecting the teeth from obstructing matter.

The sliding disk H is provided with a sleeve, h, which surrounds the axle A and passes through the part of disk g of wheel G.

I is a vibrating lever, pivoted to the outer end of the reciprocating sleeve h, either at one end or at a point intermediate between its ends, as shown by the drawing at i, Fig. 1.

Said lever is pivoted to the cutter-frame at i′; or, if it is desired to use it as a lever of the first order, it may be pivoted to the frame-bar D at a point intermediate between its points of attachment to slide h and pitman F.

By the rotation of the axle A and zigzag wheel G, a reciprocating movement on axle A is imparted to the zigzag disk H and sleeve h, and thence motion is imparted to the cutters through lever I and pitman F, in a manner that will be readily understood.

J is a buffer box or plate, secured to the frame-bar D at or near the forward end of lever I, said box being provided with a socket, in which are placed two spiral or rubber springs, (see Fig. 4,) embracing between them a pendent lug or ear on buffer-slide j.

The ends of slide j are turned upward at j″, and the lever I, resting on slide j, vibrates between said ends, which serve to check with a yielding resistance the momentum of the lever and of the sickle bar connected therewith at or near the end of each vibration, and also, by the gathered power of the springs, to assist in starting the lever and sickle-bar on the return stroke.

By setting the buffer box and bar forward or backward on the frame-bar D, the power or resistance of the buffers may be increased or diminished at pleasure.

K K are two angle-irons or frame-bars, mounted loosely on sleeves C $C^1$, and K' is the driver's frame or platform, secured to irons K, to which the tongue is attached, and upon which the driver's seat is mounted in any usual manner.

The irons K are provided with horizontal ears $k\ k$, to which the clutch-levers L L are pivoted, said levers being connected at their forward ends by toggle-links L' L', which rest upon the platform K in convenient position to be operated by the driver's foot, for engaging or disengaging the drive-wheels B and axle A, for throwing the machine into or out of gear.

Springs $l$ serve to hold the clutches engaged with the drive-wheels when not held out by the levers and toggle-links described.

The sickle-bar M (see Fig. 3) is provided on its lower forward edge with a projecting lip or flange, which fits a slot or recess in the guard-fingers, and serves to hold the cutters down to their work, dispensing with the usual caps or guides on the top of the bar for that purpose.

Having now described my invention, what I claim as new, and desire to secure by Letters Patent, is—

1. The double zigzag wheel G, in combination with the reciprocating zigzag disk, substantially as and for the purpose described.

2. The combination of the reciprocating zigzag wheel or disk H, sleeve $h$, and lever I, operating substantially as described.

3. The vibrating cutter-frame, consisting of frame-bar D and sleeves C $C^1$, connected together as described, in combination with the pivoted drag or brace bar E, arranged and operating as described.

4. The buffer-box J and slide $j$, constructed as described, in combination with the frame-bar D and vibrating lever I, as described.

WM. F. GOODWIN.

Witnesses:
   A. W. BROWNE,
   I. W. TANNER.